United States Patent
Gold et al.

[11] Patent Number: 5,961,247
[45] Date of Patent: Oct. 5, 1999

[54] MECHANISM FOR THE DETACHABLE ATTACHMENT OF A BLADED WHEEL TO A TURBOMACHINE

[75] Inventors: Peter Werner Gold, Aachen; Thomas Casper, Theley, both of Germany

[73] Assignee: Mannesmann Aktiengesellschaft, Düsseldorf, Germany

[21] Appl. No.: 08/885,019

[22] Filed: Jun. 30, 1997

[30] Foreign Application Priority Data

Jul. 1, 1996 [DE] Germany ............................ 196 27 346

[51] Int. Cl.⁶ ...................................................... F16B 2/14
[52] U.S. Cl. ...................... 403/369; 403/374.4; 403/370; 416/244 R
[58] Field of Search ..................... 403/369, 370, 403/374, 366, 367, 368, 258, 260, 374.1, 374.2, 374.3, 374.4; 415/216.1; 416/244 R, 244 A

[56] References Cited

U.S. PATENT DOCUMENTS

| | | | |
|---|---|---|---|
| 2,577,134 | 12/1951 | Land .............................. | 416/244 R X |
| 2,602,683 | 7/1952 | Aue .................................. | 415/216.1 X |
| 2,755,093 | 7/1956 | Peter et al. ...................... | 403/369 X |
| 2,843,311 | 7/1958 | Buchi .............................. | 416/244 R X |
| 3,009,747 | 11/1961 | Pitzer ............................... | 403/374 X |
| 3,941,506 | 3/1976 | Robb et al. ....................... | 416/244 A |
| 4,089,613 | 5/1978 | Babbitt, Jr. ......................... | 403/370 X |
| 4,311,224 | 1/1982 | Kato et al. ........................ | 403/369 X |
| 4,340,317 | 7/1982 | Heitmann et al. ............. | 416/244 A X |

FOREIGN PATENT DOCUMENTS

| | | |
|---|---|---|
| 0 342 520 | 5/1989 | European Pat. Off. . |
| 973 550 | 3/1960 | Germany . |
| 1095064 | 12/1960 | Germany ............................. 403/369 |
| 1110476 | 7/1961 | Germany ............................. 403/369 |
| 1 475 380 | 5/1965 | Germany . |
| 35 32 348 A1 | 9/1985 | Germany . |
| 36 25 996 A1 | 7/1986 | Germany . |
| 44 45 297 C1 | 12/1994 | Germany . |
| 269605 | 11/1948 | Switzerland . |
| 1656220 | 6/1991 | U.S.S.R. ............................. 403/370 |
| 704139 | 2/1954 | United Kingdom ................. 403/370 |
| 2 102 536 | 7/1989 | United Kingdom . |
| PCT/US89/ 04228 | 9/1989 | WIPO . |

*Primary Examiner*—Harry C. Kim
*Attorney, Agent, or Firm*—Cohen, Pontani, Lieberman & Pavane

[57] ABSTRACT

Disclosed is a mechanism for the detachable attachment of a bladed wheel to a shaft of a turbomachine. The bladed wheel has a sleeve-like extension that faces the shaft. A fastening unit is arranged in the sleeve-like extension, the latter being circumscribed by a thicker wall bushing of a cylindrical recess of the shaft. A screw element is used as a locking element.

17 Claims, 5 Drawing Sheets

MECHANISM FOR THE DETACHABLE ATTACHMENT OF A BLADED WHEEL TO A TURBOMACHINE

BACKGROUND OF THE INVENTION

The invention relates to a mechanism for the detachable attachment of a bladed wheel, especially a radial bladed wheel, to a turbomachine, with a screw element that connects the shaft to the wheel, the screw element being located axially parallel to the bladed wheel and shaft.

FIG. 2 of EP 0575017 A1 shows a generic attachment mechanism for a radial bladed wheel. That generic attachment mechanism has an expansion bolt that extends through the bladed wheel to the shaft part. A threaded boring in the shaft part holds the expansion bolt. The torque is actually transmitted by means of a serrated toothing arranged on the back of the bladed wheel and the front face of the shaft part. For the usual range of applications, the intermediate part shown in FIG. 2 (ref. num. 16) can be dispensed with, meaning that the bladed wheel and the shaft part are directly connected to each other. The serrated toothing is clamped together by means of a nut that is screwed onto the threaded section of the expansion bolt that extends through the bladed wheel. A disadvantage of this design is that the serrated toothing is expensive to manufacture.

SUMMARY OF THE INVENTION

The object of the present invention is to provide a mechanism for the detachable attachment of a bladed wheel, especially a radial bladed wheel, to a turbomachine, that is economical to produce and small in size but which has a high torque transmissibility and good balance reproducibility.

This object is attained by means of the present invention.

In the invention in a device as generally described above, a fastening unit interacts with a locking screw. The main part of the fastening unit is a clamping bushing, on the outer cylindrical surface of which there is arranged at least one clamping element in the form of a tapered ring pair.

When the clamping elements are tightened, the outer ring of the clamping element expands in diameter so that the outer ring contacts the inner wall of the sleeve-type extension of the bladed wheel in a force-locking manner. The inner ring of the clamping element is reduced in diameter when the locking screw is tightened so that the inner ring contacts the outer cylindrical surface of the clamping bushing in a force-locking manner. The normal force thereby created is adequate for slip-free torque transmission between the shaft and the bladed wheel. The sleeve-type extension of the bladed wheel is clamped radially against the thicker-walled bushing of the shaft part. Torque is transmitted via the annular area between the sleeve-type extension and the thicker-walled bush. The radial centering and the subsequent radial clamping are carried out over the same diameter.

In the invention, the number of parts, and the space required, are minimized when a threaded boring, into which the locking screw can be screwed, is arranged in the shaft and when the head of the locking screw comes to rest on the front face of the clamping bushing that faces the bladed wheel. This latter feature also provides the advantage of maintaining the locking screw a sufficient distance from the "hot" area of the bladed wheel so that the heat stress on the locking screw remains low.

In another embodiment, the clamping bushing is equipped with a threaded boring with a diameter which allows the locking screw to be inserted through the fastening unit. The advantage of this arrangement is that in the event of difficulties in detaching the fastening unit, an auxiliary screw, with a diameter larger than that of the locking screw, can be screwed into the clamping bushing and can be used to displace the fastening.

A further advantage of the connection according to the invention is that active force status, even after disassembly and reassembly, remains almost the same as upon the first balancing, so that no renewed balancing is necessary.

In some cases, it can be advantageous for the fastening unit to be protected against the compression medium. In such cases, a seal is arranged in the contact region between the thicker-walled bushing and the journal-like end of the bladed wheel. In addition, the boring of the bladed wheel is closed by means of a closing screw.

Other objects and features of the present invention will become apparent from the following detailed description considered in conjunction with the accompanying drawings. It is to be understood, however, that the drawings are designed solely for the purposes of illustration and not as a definition of the limits of the invention, for which reference should be made to the appended claims.

BRIEF DESCRIPTION OF DRAWINGS

In the drawings, wherein like reference characters denote similar elements throughout the several views.

DETAILED DESCRIPTION OF THE PRESENTLY PREFERRED EMBODIMENT

Figure 1:
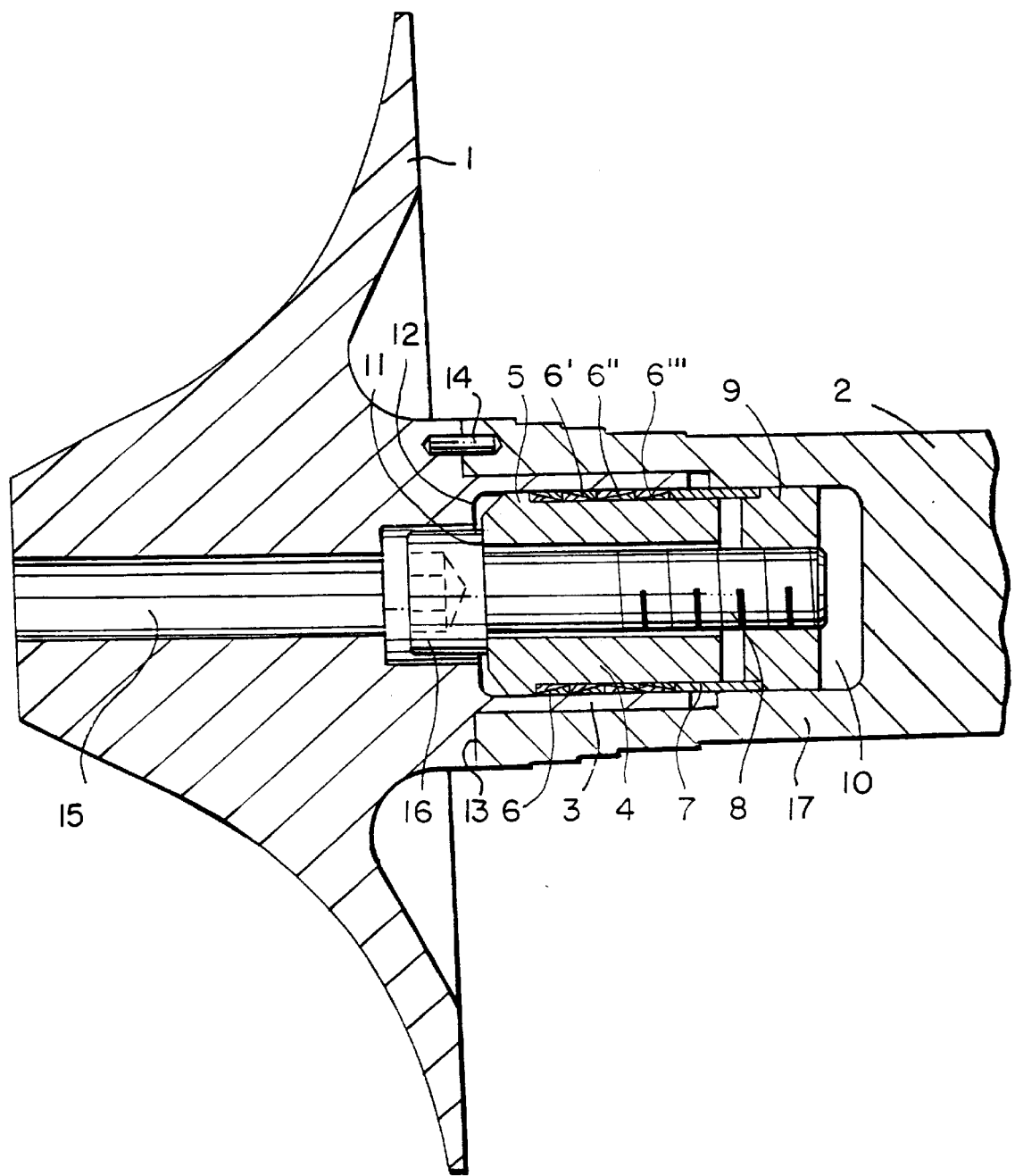
FIG. 1 shows in longitudinal section a first embodiment of a bladed wheel attachment according to the invention.

FIG. 1 shows, in longitudinal section, a first embodiment of the bladed wheel attachment according to the invention. The bladed wheel 1, here only generally illustrated, is a radial bladed wheel having a sleeve-type extension 3 extending in the direction of shaft part 2. The fastening unit according to the invention is arranged substantially in this extension 3. In this embodiment, the fastening unit consists of a clamping bushing 4, which has a step 5, extending outwardly in a collar-like fashion at one end. A total of four clamping elements 6, 6', 6", 6'" in the form of tapered ring pairs are arranged on the outer cylindrical surface of the clamping bushing 4. Specifically, these elements are arranged in such a way that step 5 of clamping bushing 4 forms a stop in the direction of one of the sides. A sleeve 7, which can be slipped onto the clamping bushing 4, serves as the stop for the clamping elements 6 through 6'" on the shaft side. The sleeve 7 is supported at its other free end by a nut 9, which engages a locking screw 8, the latter extending through a boring 43 in the clamping bushing 4. The nut 9 moves in a cylindrical recess 10 of the shaft part 2. In this embodiment, the four clamping elements 6 through 6'" are arranged in such a way that the sloping sections of two clamping elements 6, 6' decline in the direction of the shaft part 2 and the sloping sections of the next two clamping elements 6", 6'" decline in the opposite direction. This arrangement allows optimal use to be made of the effect of the clamping elements 6 through 6'''.

The assembly of the structure is carried out by inserting the fastening unit, including the locking screw 8, into the sleeve-type extension 3 of the bladed wheel 1. Specifically, the unit is inserted until the front face 11 of the clamping bushing 4 that faces the bladed wheel 1 comes to rest on the inner side 12 of the sleeve-like extension 3. The bladed wheel 1, together with the fastening unit, is then inserted into the cylindrical recess 10 of the shaft part 2 until the front face 13 of the thicker-walled bushing 17 of the recess 10 of the shaft part 2 comes to rest on the bladed wheel 1. The wheel 1 and shaft 2 are tangentially affixed by an adjustment pin 14 which is placed securely in the blind hole boring of the wheel 1 and, with play, into that of the shaft part 2. This measure avoids double fitting with respect to the interaction of the shaft part 2 with the sleeve-type extension 3 of the bladed wheel. Tightening is carried out by means of an inner hexagonal spanner (not shown here), which is inserted through the bore 15 of the bladed wheel 1 up to the head 16 of the locking screw 8. Rotating the locking screw 8 causes the nut 9 to be moved axially, so that pressure is exerted on the clamping elements 6 through 6''' via the sleeve 7. Because of their declining orientation or slant, the clamping elements are able to deviate radially. More specifically, the clamping elements are able to deform in such a way that a high normal force is produced by the pressure against the inner wall of the sleeve-type extension 3. The result of the elastic expansion of the sleeve-type extension 3 is that the extension 3 is pressed against the thicker-walled bushing 17 of the recess 10 of the shaft part 2. The thickness of the sleeve 17 in the area of the recess 10 is such that the normal force produced by the fastening unit can be absorbed without permanent deformation.

Torque is transmitted between the shaft part 2 and the bladed wheel 1 by means of the frictional lock produced by the normal force between the bushing 17 of the recess 10 of the shaft part 2 and the sleeve-type extension 3 of the bladed wheel 1. To lower the coefficient of friction between the clamping elements 6 through 6''' the latter are lubricated with grease such as molycote. Other lubricants are also suitable. The reduction of the frictional coefficient, enables one to make better use of the effect of the clamping elements 6 through 6''' such as permitting the selection of a smaller locking screw 8. In contrast, the selected frictional coefficient between the sleeve-type extension 3 of the bladed wheel 1 and the thicker-walled sleeve 17 of the shaft part 2 should be as large as possible, because as mentioned above, the torque is transmitted at this point.

Figure 2:
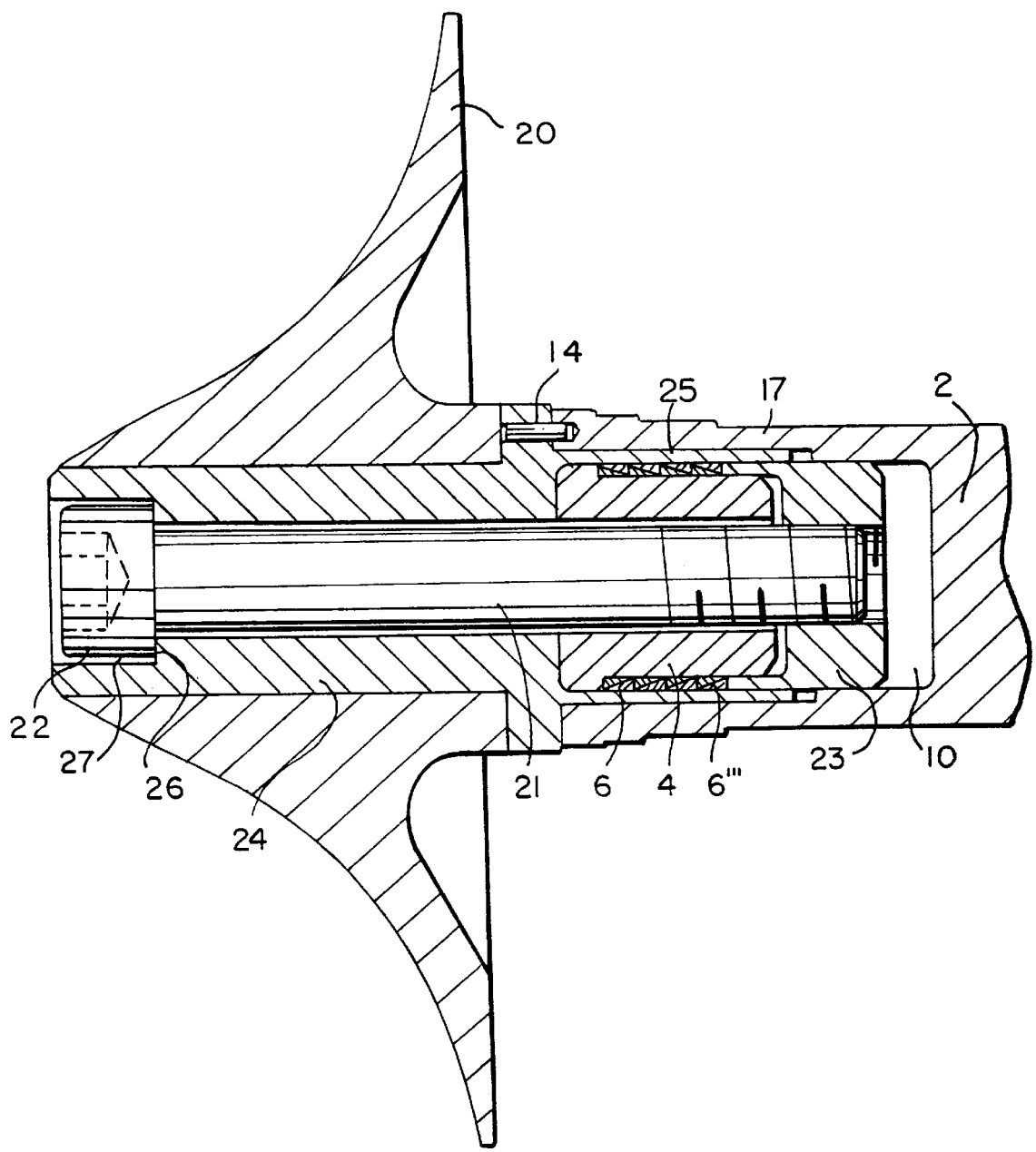
FIG. 2 shows in longitudinal section an alternate embodiment of the invention.

FIG. 2 shows another embodiment of the invention in the same longitudinal section as in FIG. 1. The same reference numerals have been used for the same parts. In this embodiment, the bladed wheel 20 is placed on a flange-type journal 24. The journal 24 also has a sleeve-type extension 25. A one-part nut element 23 can be placed onto the clamping bushing 4 to produce a counterpressure. In contrast to FIG. 1, the slopes of the clamping elements 6 through 6''' all decline in the direction of the shaft part 2. The assembly is somewhat different than that for the FIG. 1 embodiment. In the FIG. 2 embodiment, the bladed wheel 20 is secured to the flange-like journal 24, e.g., by shrinkage. Subsequently, the fastening unit is inserted into the sleeve-type extension 25 and the locking screw 21 is loosely turned. The bladed wheel 20, together with the fastening unit, is then placed into the recess 10 of the shaft part 2. The adjustment pin 14 again serves for tangential fixation. By applying an inner hexagonal spanner (not shown) to the head 22 of the locking screw 21, it is possible to turn the latter and thus to move the nut 23 axially. Upon being tightened, the head 22 of the locking screw 21 comes to rest on the front face 26 of the recess 27 of the journal 24. A sufficient normal force for the required frictional lock between the sleeve-type extension 25 of the journal 24 and the thicker-walled bushing 17 of the shaft part 2 is then produced in the same manner as in the embodiment of FIG. 1.

Figure 3:
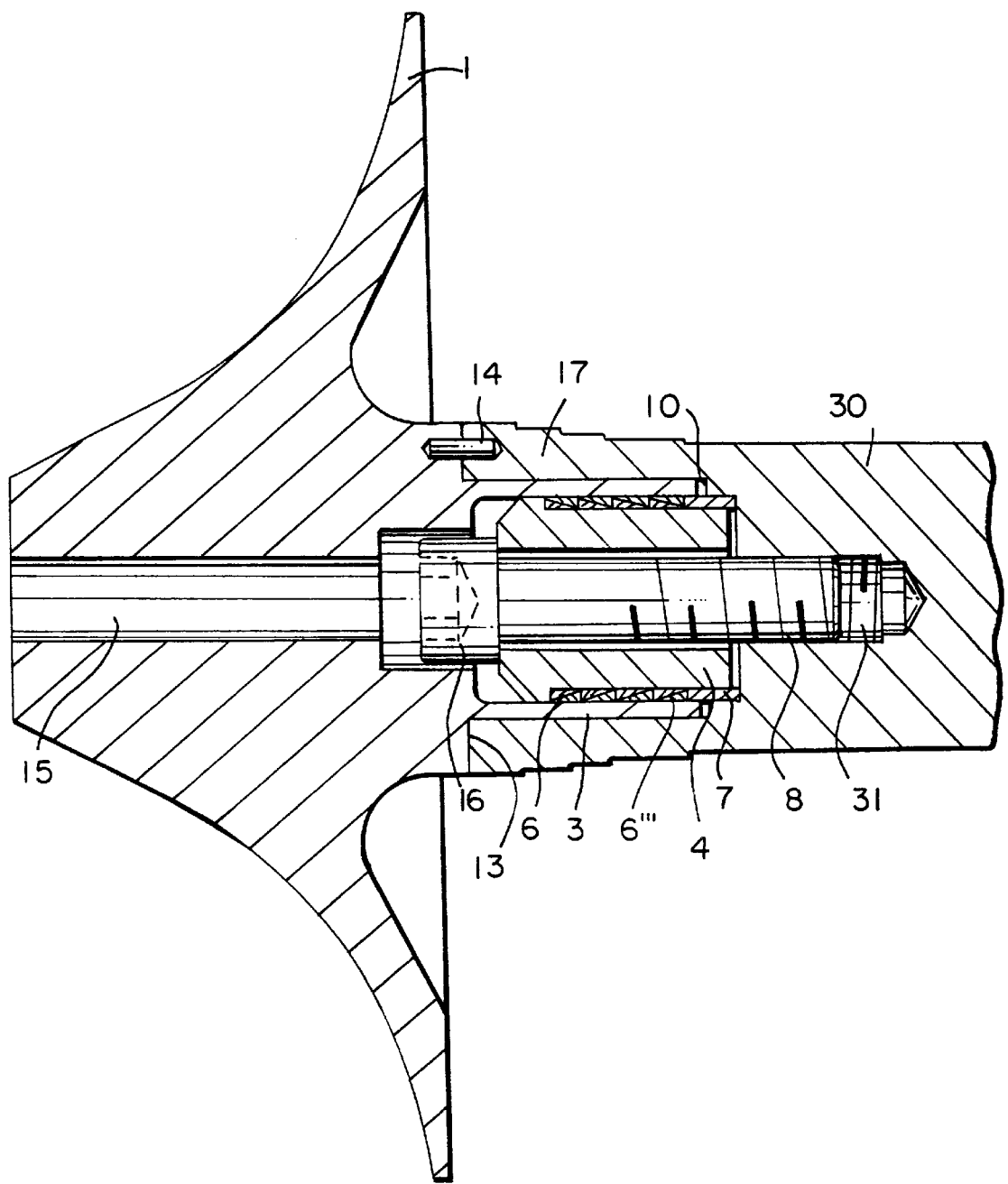
FIG. 3 shows in longitudinal section another alternate embodiment.

FIG. 3 shows another embodiment in the same longitudinal section as in FIGS. 1 and 2. Again, the same reference numerals are used for the same parts. In this embodiment in contrast to FIG. 1, no separate nut is used. Rather, the nut is formed by a threaded bore 31 arranged in the shaft part 30. The locking screw 8 can be screwed into the threaded bore 31. As can be seen, this structure has a reduced length but has improved rigidity of the connection because the bushing 17 is considerably shorter than that of the FIG. 1 embodiment. The threaded bore 31 in the shaft part 30 must be carefully produced so that no notch stresses that reduce the alternate strength are created. Assembly is comparable to that described in connection with FIG. 1 so that no further explanation is necessary.

Figure 4:
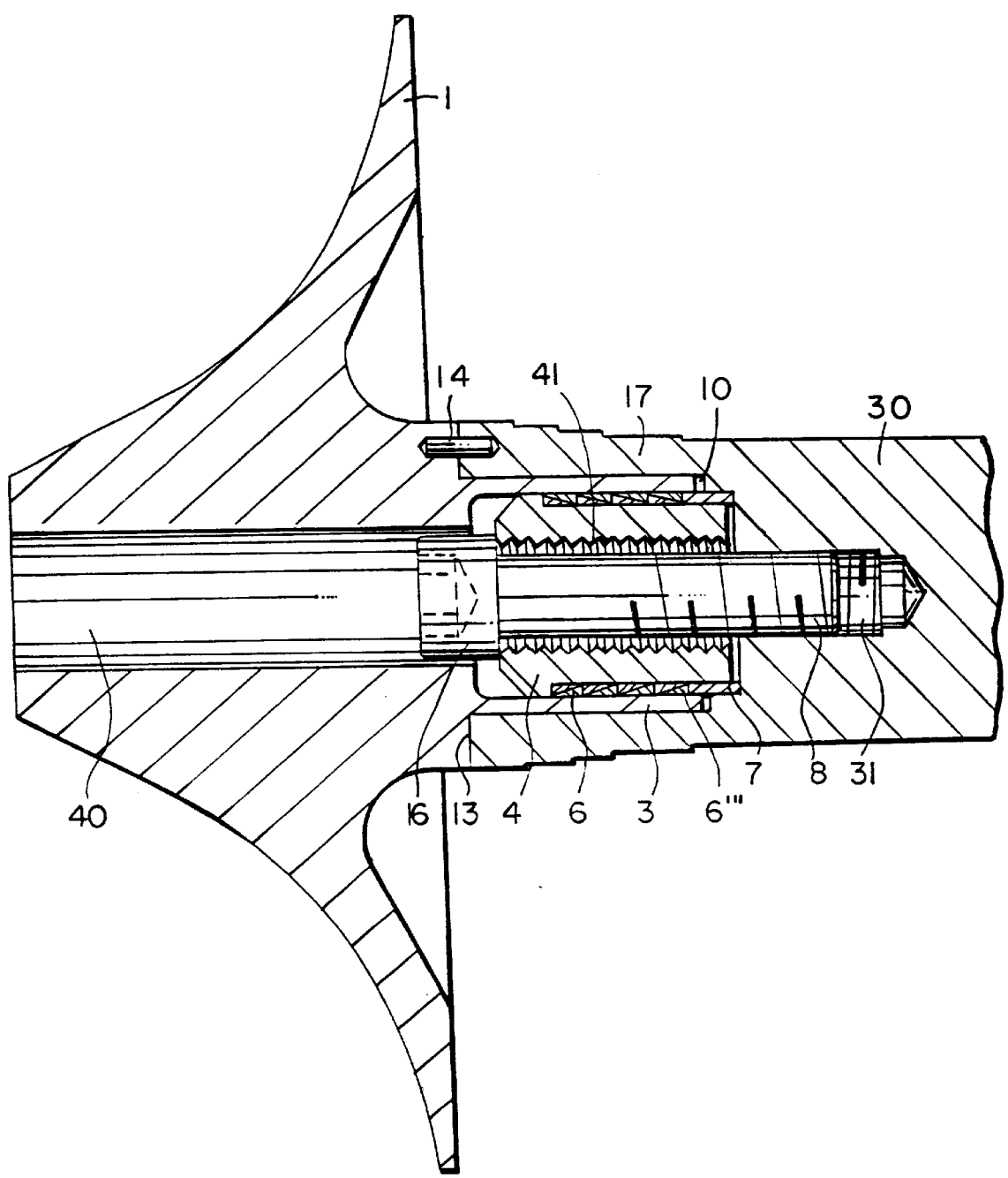
FIG. 4 shows in longitudinal section a fourth embodiment.

FIG. 4 shows another embodiment in the same longitudinal section as in FIGS. 1 to 3. The same reference numerals are again used for the same parts. In this structure, in contrast to those of FIGS. 1 to 3, a threaded bore 41, instead of a smooth bore, is arranged in the clamping bushing 40. The threaded bore 41 is oriented so as to be parallel to the axis of the threaded bore 31 in the shaft part 30. The first threaded bore 41 in the clamping bushing 40 has a larger diameter, so that the locking screw 8 can be inserted therethrough. The bore 42 in the bladed wheel 1 is expanded, specifically, in such a way that the boring is somewhat larger than the screw head 16 of the locking screw 8. This arrangement has the advantage that in the event of difficulties in the automatic loosening of the fastening unit, an auxiliary screw (not shown) can be screwed into the threaded bore 41 of the clamping bushing 40 to slightly press back the fastening unit.

To improve the flow conditions for the bladed wheel 1, 20 (FIGS. 1 to 4), a wheel cap (not shown here) can be provided as needed. The journal of the wheel cap would be inserted into the boring 15, 42 (FIGS. 1, 3, 4) of the bladed wheel or into the recess of the screw head 22 of the locking screw 21 (FIG. 2).

Figure 5:
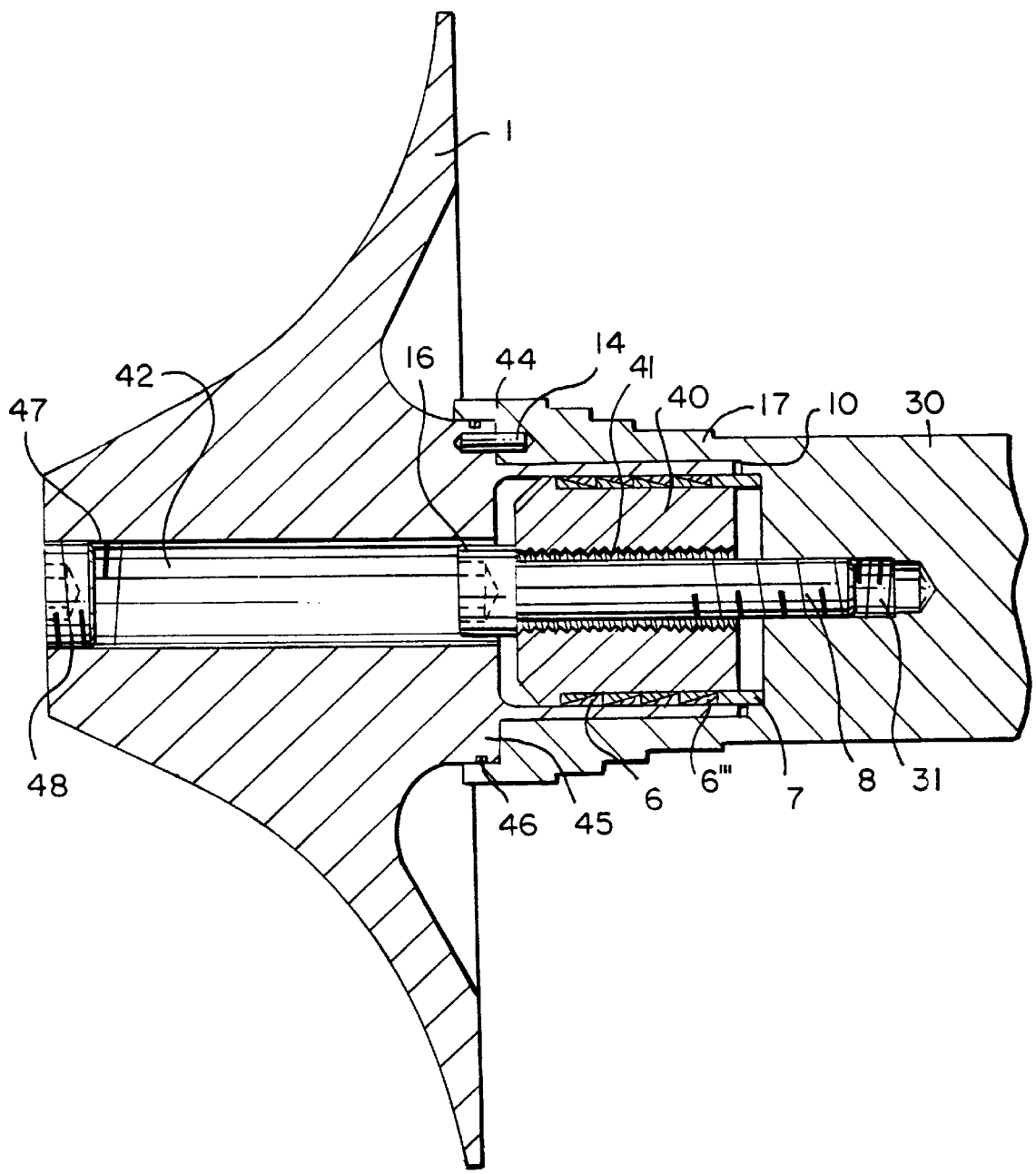
FIG. 5 shows a variant of the embodiment of FIG. 4, in the same longitudinal section.

FIG. 5 shows a variation of the embodiment of FIG. 4. The same structure numerals are used for the same parts. In this example, in contrast to FIG. 4, the thicker-walled bushing 17 of the recess 10 of the shaft part 30 has a collar 44 that is directed toward the bladed wheel 1 and encompasses the journal-type end 45 of the bladed wheel 1. In this end area 45 of the bladed wheel 1, a seal 46, e.g., an O-ring, is arranged in a ring nut. This measure prevents the medium that flows down on the rear of the bladed wheel from penetrating into the area of the fastening unit. In this embodiment, a closing screw 48, instead of a wheel cap, is screwed into a threaded blind hole boring 47 which is arranged in the front face region of the bore 42 of the bladed wheel 1. This closing screw 48 serves as a seal of the fastening unit. The selected diameter of the threaded blind hole boring 47 is such that the head 16 of the locking screw 8 can be easily inserted through the boring 47.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. An assembly of a bladed wheel and a shaft of a turbomachine wherein said bladed wheel is detachably attached to the shaft, said assembly comprising:

a bladed wheel;

a turbomachine having a shaft;

a mechanism for a detachable attachment of the wheel to the shaft, the mechanism comprising:
   (i) a sleeve-like extension extending from the bladed wheel towards the shaft;
   (ii) a fastening unit which is at least substantially arranged in the sleeve-like extension, said sleeve-like extension being encompassed by a thicker-walled bushing of a correspondingly cylindrical recess of the shaft;
   (iii) a clamping bushing encompassed by said sleeve-like extension; and
   (iv) a screw element that connects the shaft to the bladed wheel and is located axis-parallel to the bladed wheel and shaft wherein the screw element is a locking screw which interacts with the fastening unit.

2. The assembly of claim 1, wherein the clamping bushing is cylindrical and has a collar-like step, and the fastening unit further comprises at least one clamping element in the form of a tapered ring pair arranged on the outer surface of the clamping bushing, said clamping element contacting at least one side of the collar-like step and on the other side contacting a sleeve placed onto the clamping bushing, the locking screw being screwed into a nut element that interacts with the sleeve.

3. The assembly of claim 2, wherein the nut element is a nut arranged in the recess of the shaft.

4. The assembly of claim 3, wherein the nut forms one unit with the sleeve.

5. The assembly of claim 2, wherein the clamping bushing has a front surface that faces the bladed wheel and the locking screw has a head contacting the front surface.

6. The assembly of claim 2, wherein the clamping bushing has a bore with an inner diameter that is larger than a shaft diameter of the locking screw.

7. The assembly of claim 1, wherein the bladed wheel is a radial bladed wheel.

8. The assembly of claim 1, wherein the locking screw has a head and the bladed wheel is arranged on a flange-like journal, through which the locking screw extends and which forms one unit with the sleeve-type extension, whereby the head of the locking screw comes to rest in a cylindrical recess of the journal.

9. A detachable attachment of a bladed wheel to a shaft of a turbomachine having a screw element connecting the wheel and the shaft and extending along a horizontal axis of the shaft comprising:

a sleeve-like extension extending from the bladed wheel towards the shaft;

a fastening unit which is at least substantially arranged in the sleeve-like extension, said sleeve-like extension being encompassed by a thicker-walled bushing of a correspondingly cylindrical recess of the shaft;

a clamping bushing encompassed by said sleeve-like extension;

and wherein the screw element is a locking screw which interacts with the fastening unit.

10. The attachment of claim 9, wherein the clamping bushing is cylindrical and has a collar-like step.

11. The attachment of claim 10 wherein the fastening unit has at least one clamping element in the form of a tapered ring pair arranged on the outer surface of the clamping bushing.

12. The attachment of claim 11 wherein said clamping element contacts at least one side of the collar-like step and on the other side contacts a sleeve placed onto the clamping bushing, the locking screw being screwed into a nut element that interacts with the sleeve.

13. The attachment of claim 12, wherein the nut element is a nut arranged in the recess of the shaft.

14. The attachment of claim 13, wherein the nut forms one unit with the sleeve.

15. The attachment of claim 10, wherein the clamping bushing has a front surface that faces the bladed wheel and the locking screw has a head contacting the front surface.

16. The attachment of claim 10, wherein the locking screw has a shaft diameter and the clamping bushing has a bore with an inner diameter that is larger than the shaft diameter of the locking screw.

17. The attachment of claim 10, wherein the locking screw has a head and the bladed wheel is arranged on a flange-like journal, through which the locking screw extends and which forms one unit with the sleeve-type extension, whereby the head of the locking screw comes to rest in a cylindrical recess of the journal.

* * * * *